United States Patent [19]
Arai et al.

[11] Patent Number: 5,757,592
[45] Date of Patent: May 26, 1998

[54] LAMINATED COIL FOR A MAGNETIC HEAD OF A DISK DRIVE AND METHOD FOR MANUFACTURING THE SAME

[75] Inventors: Yuichi Arai, Yokohama; Sakae Kobayashi, Fujisawa; Kohki Noda, Fujisawa; Kazuya Takeda, Fujisawa; Hiroshi Umezaki, Fujisawa, all of Japan

[73] Assignee: International Business Machines Corporation, Armonk, N.Y.

[21] Appl. No.: 709,144

[22] Filed: Sep. 6, 1996

Related U.S. Application Data

[63] Continuation of Ser. No. 437,487, May 9, 1995, abandoned, which is a continuation of Ser. No. 220,627, Mar. 29, 1994, abandoned, which is a continuation of Ser. No. 874,283, Apr. 24, 1992, abandoned.

[30] Foreign Application Priority Data

Apr. 26, 1991 [JP] Japan ..................... 3-123125

[51] Int. Cl.$^6$ ........................................ G11B 5/20
[52] U.S. Cl. ........................... 360/123; 360/119
[58] Field of Search ........................ 360/123, 103, 360/119, 124; 29/603.23, 603.24, 603.26, 603.27

[56] References Cited

U.S. PATENT DOCUMENTS

| | | | |
|---|---|---|---|
| 3,731,005 | 5/1973 | Shearman | 360/123 |
| 4,357,640 | 11/1982 | Heinz et al. | 360/119 |
| 4,418,472 | 12/1983 | Lorenze, Jr. | 360/121 |
| 4,863,557 | 9/1989 | Kokaku et al. | 360/122 |

FOREIGN PATENT DOCUMENTS

| | | | |
|---|---|---|---|
| 0198560 | 10/1986 | European Pat. Off. | 360/123 |
| 53-89726 | 7/1978 | Japan | 360/123 |
| 62-16445 | 6/1981 | Japan . | |
| 64-5366 | 5/1982 | Japan . | |
| 62-295206 | 12/1987 | Japan | 360/123 |

OTHER PUBLICATIONS

IBM Technical Disclosure Bulletin, vol. 12, No. 6, Nov. 1969 (Moreno).

IBM Technical Disclosure Bulletin, vol. 15, No. 2, Jul. 1972 (O'Donnell, Jr.).

*Primary Examiner*—Stuart S. Levy
*Assistant Examiner*—Kevin M. Watkins
*Attorney, Agent, or Firm*—Richard E. Billion; Roy W. Truelson; Andrew J. Dillon

[57] ABSTRACT

A coil encircling the ferrite core of a magnetic head attached to a slider used in a hard disk drive is formed using two mating chips. A first chip having layered wires and bonding bumps is inserted in the winding window between the ferrite core and the body of the slider. A second chip having layered wires, bonding bumps and a groove straddling the ferrite core is disposed outside the winding window and mates with the first chip. Bonding bumps, comprising low-melting solder, are heat bonded to form a continuous coil.

19 Claims, 10 Drawing Sheets

LAMINATED COIL FOR A MAGNETIC HEAD OF A DISK DRIVE AND METHOD FOR MANUFACTURING THE SAME

This is a continuation of application Ser. No. 08/437,487, filed May 9, 1995, now abandoned, which is a continuation of application Ser. No. 08/220,627, filed Mar. 29, 1994, now abandoned, which is a continuation of application Ser. No. 07/874,283, filed Apr. 24, 1992, now abandoned.

FIELD OF THE INVENTION

The present invention relates to a magnetic head for a hard disk, suitable to high-density magnetic recording and more particularly to a laminated coil for the magnetic head by which performance of the ferrite head can be improved.

BACKGROUND OF THE INVENTION

FIG. 2 shows the appearance of a conventional ferrite head for a hard disk. The ferrite head is composed of a ferrite slider 3 and a ferrite core 4 bonded to each other and unified through a gap member 9 and a coil 11 formed by a wire wound though a winding window 5, through which a signal current flows for recording and reproducing. As the wire, a Cu conductor the diameter of which is 30 m or more from an aspect of mechanical intensity is usually used.

Being a combination of inexpensive ferrite, glass, etc. and produced mainly by mechanical processing, such a ferrite head can be made at a significantly low cost in comparison with a thin film head. Besides, the performance of reading/writing in the ferrite head, especially, in an area of low recording density, is equivalent to or better than the thin film head. This is the reason why the ferrite head is frequently used as a head for a small-sized hard disk. A MIG (Metal In Gap) head, in which magnetic metal is inserted in a gap section of a ferrite head has recently been implemented. The appearance of the MIG head being the same as that of the ferrite head, the MIG head is hereupon assumed to be a kind of ferrite head.

Japanese Published Examined Patent Application No.62-16445 discloses a magnetic head in which a conductive layer and an insulating layer are alternately stacked around a block which can be a magnetic core and a magnetic path layer both ends of which contact said block formed on the stacked layers.

Also, Japanese Published Examined Patent Application No.64-5366 discloses a thin film magnetic head in which a first magnetic layer, an insulating layer, a coil layer, and a part of a second magnetic layer are formed on a substrate and the remaining part of the second magnetic layer is formed on a protective plate and both layers are unified.

A conventional magnetic head involves a problem to be solved for magnetic recording at a high density. That is, since in the conventional ferrite head, magnetic circuits are formed from ferrite bulk materials, a value of inductance is approximately five times that of a thin film head and the high-frequency characteristic of a coil is inferior to the thin film head. This causes a problem in increasing recording density. An object of the present invention is to solve such a problem and implement high-density recording with a ferrite head. A high inductance in the ferrite head is caused by the magnetic path and cross-sectional area of a magnetic circuit through ferrite being greater than those of a magnetic circuit (thin film permalloy) in the thin film head. The shape of a ferrite core and the size of a winding window depend on the space for winding Cu wires and its mechanical intensity and thus it is very difficult to obtain the predetermined number of turns of wire to be wound and at the same time reduce the size of the core.

The conventional ferrite head involves another problem for coil winding. That is, for the conventional ferrite head, operations for winding Cu wires for each head through the winding window are needed. The operations that require long time, whether they are auto or manual, prevent cost saving.

The conventional ferrite head involves still another problem for the size and load of the coil. That is, as recording density increases, a slider has a tendency to decrease its size. However, since the coil needs a predetermined diameter of wire and number of turns of wire, it is very difficult to reduce the size of the coil. For this reason, the slider and the coil become unbalanced, thus floating becomes unstable and a shock, if any, causes the ferrite core to be damaged.

BRIEF SUMMARY OF THE INVENTION

According to the present invention, to solve the above problems, a coil for a ferrite head is made by using thin film micro-fabrication technology. The thin film micro-fabrication technology includes a thin film mounting technique such as evaporation, sputtering, plating, etc., photolithography, and bonding.

. According to the present invention, a substrate such as a Si wafer, etc. and the above thin film micro-fabrication technology are used to form two kinds of chips. As shown in FIG. 1, a chip 1 and chip 2 are connected to each other so that they straddle a ferrite core 4. On the chip 1, multi-layered Cu wires 10 and bonding bumps (not shown in FIG. 1) are formed. On the chip 2, the multi-layered Cu wires 10 and conductive paths (not shown in FIG. 1) which penetrate the chip 2 are formed and at the end, that is, on the bottom surface of the chip 2, bonding bumps (not shown in FIG. 1) are formed. With respect to the chip 2, a groove 6 is formed on the bottom surface so that the groove 6 can straddle the magnetic core 4 made of magnetic material, typically ferrite. To use the chips, chip 1 is first inserted in a winding window to fix it to the side surface of a slider 3 made of the same magnetic material as the core 4. Then the chip 2 is disposed so that the groove 6 straddles the ferrite core 4 and the bonding bumps of both chips are bonded to one another by melting. Thus a coil encircling the ferrite core is formed from the multi-layered Cu wires on both chips and the conductive paths which penetrate the chip 2. The coil, made by using the thin film micro-fabrication technology, is hereinafter called a laminated coil.

DETAILED DESCRIPTION

Figure 1:
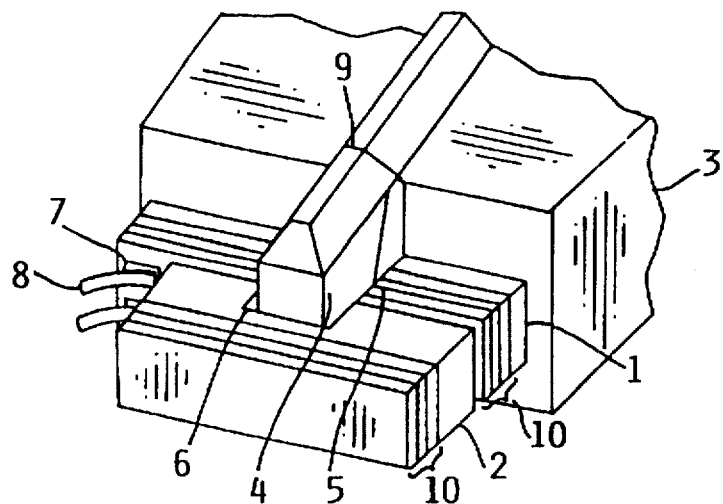
FIG. 1 is a perspective view showing an embodiment of the present invention.
Figure 2:
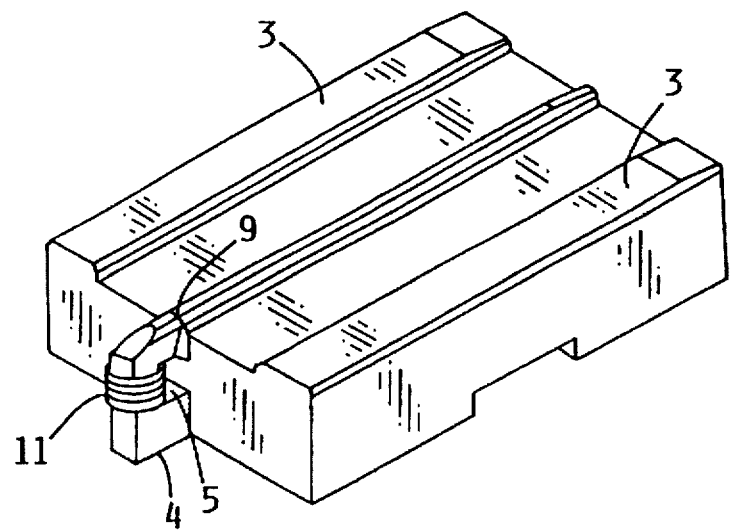
FIG. 2 is a perspective view showing a conventional ferrite head and coil.
Figure 3A:
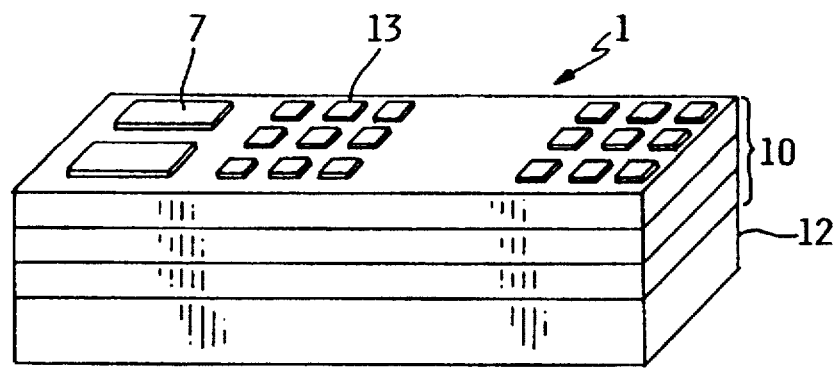
FIGS. 3A and 3B show perspective views of a laminated coil member according to the present invention.
Figure 3B:
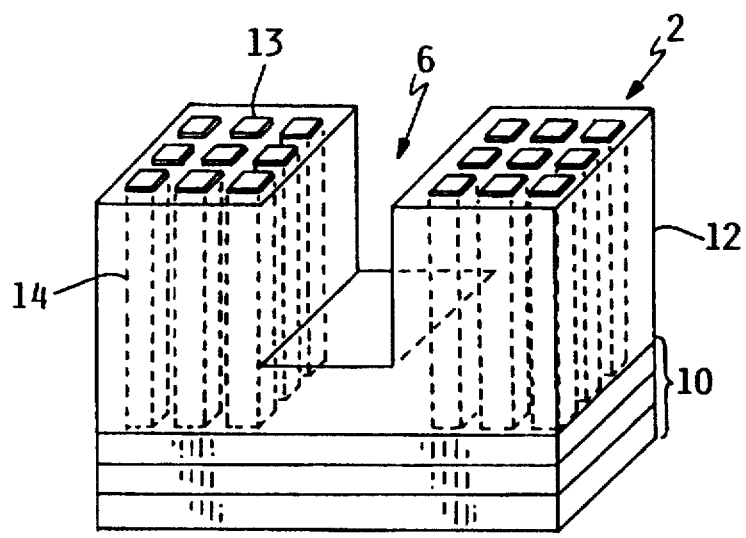
Figure 4A:
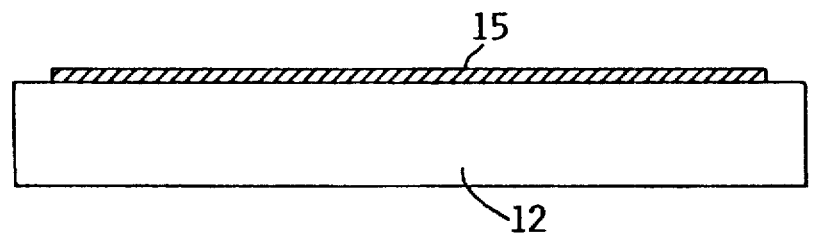
FIGS. 4A–4D show process charts for manufacturing the chip 1 for a laminated coil according to the present invention.
Figure 4B:
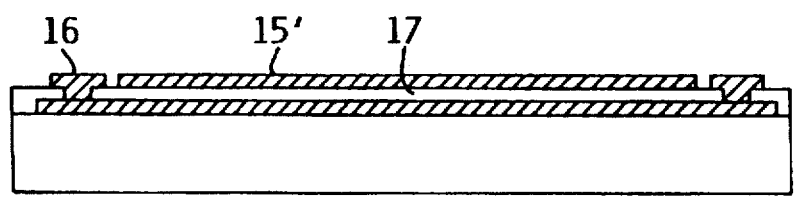
Figure 4C:
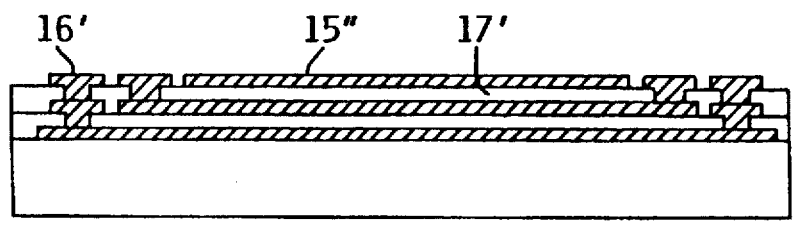
Figure 4D:
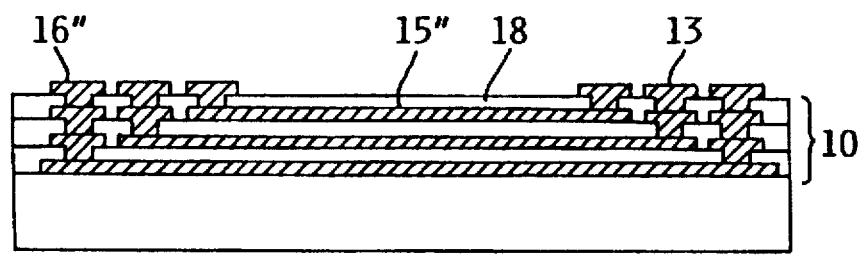
Figure 5A:
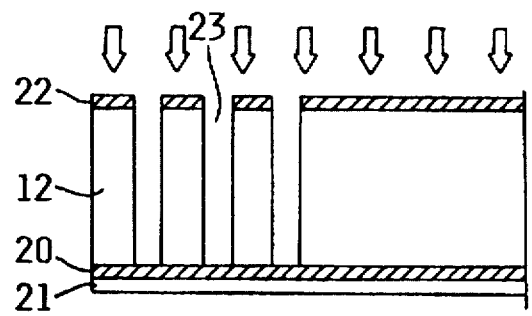
FIGS. 5A–5D show process charts for manufacturing the chip 2 for a laminated coil according to the present invention.
Figure 5B:
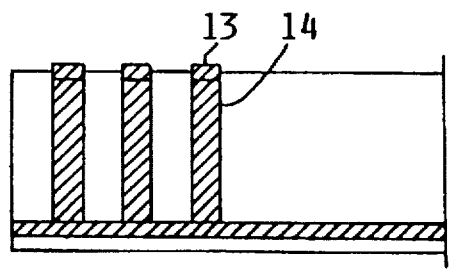
Figure 5C:
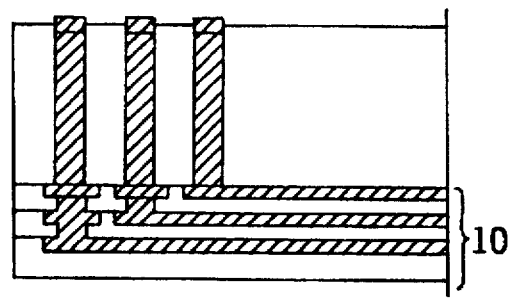
Figure 5D:
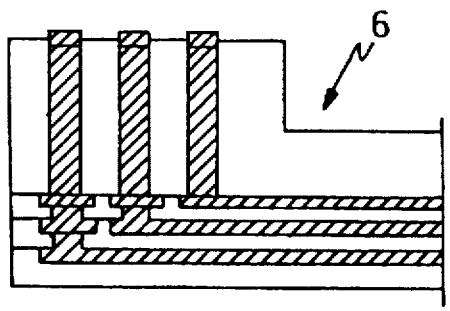
Figure 6A:
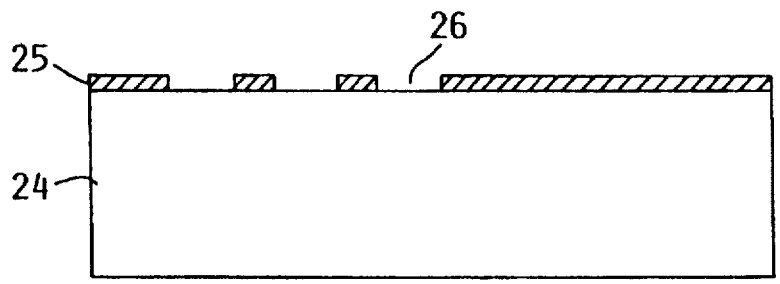
FIGS. 6A–6D show process charts for making penetrating holes used for a laminated coil according to the present invention.
Figure 6B:
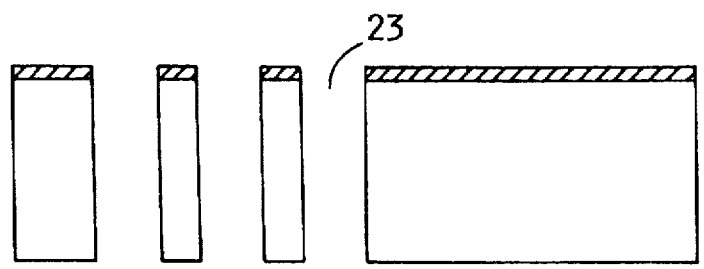
Figure 6C:
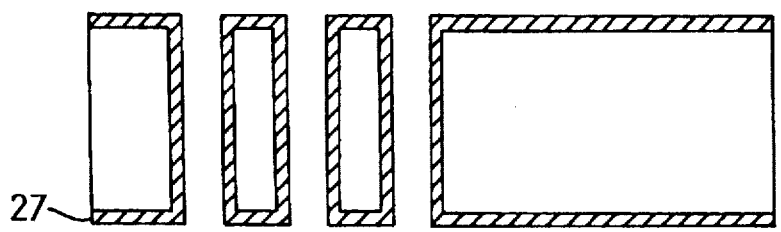
Figure 6D:
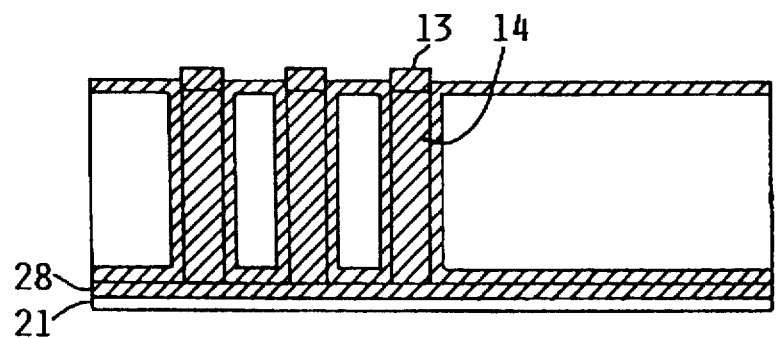

In the following, an embodiment of the present invention is described by reference to FIG. 1 and FIG. 3 to FIG. 6. FIG. 3 shows perspective views of the chip 1 and chip 2. In the chip 1, the multi-layered Cu wires 10 and bonding bumps 13 are formed on a Si substrate 12. In the chip 2, the multi-layered Cu wires 10, conductive paths 14 which extend through the substrate, the bonding bumps 13, and the groove 6 which straddles the ferrite core are formed. The bonding bumps are formed from low-melting solders and melt at about 150 C. in heat treatment. The chips are disposed as shown in FIG. 1 and bonded to each other by melting the bonding bumps. External electrical connections are provided through bonding pads 7 at an end of the chip 1 and current is supplied through wire-bonded wires 8.

FIG. 4 shows processes for manufacturing the chip 1. First, Cu wires 15 are formed on the Si substrate 12 by plating (FIG. 4(a)). Then an inter-layer insulating film 17 with through holes 16 is formed by using a photoresist and then second-layered Cu wires 15' are formed by plating (FIG. 4(b)). An inter-layer insulating film (photoresist) 17' with through holes 16' and third-layered Cu wires 15" are formed (FIG. 4(c)). Finally, a protective film 18 made up of $AL_2O_3$ is formed, through holes 16" are made though the protective film 18, and then the bonding bumps 13 are formed by evaporation of low-melting solders in mask evaporation (FIG. 4(d)). According to the above processes, the multi-layered Cu wires are formed. Incidentally, the size of the chip is approximately 0.3 mm×1.5 mm and about 5000 chips can be obtained from a three-inch wafer.

FIG. 5 shows processes for manufacturing the chip 2. In the chip 2, it is necessary to form conductive paths through a Si substrate. To do this, first a metallic film (Ni) 20 and an insulating resins film 21, which can be a plating base, are laminated on one surface of the Si substrate 12 and a mask film (Ni) 22, which can be a mask for etching, is coated on the other surface of the Si substrate 12. In the mask film 22, openings for holes made through the substrate are formed by a usual photoetching (chemical etching) method and reactive ion etching is applied to Si. A gas used for etching is $CHF_3$ which erodes the Ni film very little. Holes 23 through the substrate can be thus made at sufficient process allowance (FIG. 5(a)). Then the metallic film 20 is used as a plating base and Ni plating is applied to form conductive paths 14 through the Si substrate. Then low-melting solders are evaporated by mask evaporation to form the bonding bumps 13 (FIG. 5 (b)). Then, as shown in FIG. 5(c), on the opposite side of the bonding bumps the multi-layered Cu wires 10 are formed in the same manner as in manufacturing the chip 1. Finally, on the side of the bonding bumps the groove 6 is formed by mechanical processing (FIG. 5(d)).

FIG. 6 shows another method for forming conductive paths through the Si substrate. A Si substrate 24 used is one with (110) plane. On the surface of the substrate, a $SiO_2$ film 25 of 200 nm thickness is formed, then openings 26 for holes which penetrate the substrate are formed by usual photoetching (FIG. 6(a)). Then the $SiO_2$ film is masked and etching using a 40% KOH solution at 40 C. is applied to the Si substrate. In this case, (111) plane is taken on the side surfaces of holes and holes 23, which penetrate the substrate, are formed with no side etching (FIG. 6(b)). Then the surface of the Si substrate is oxidized by a thermal oxidation method to form a $SiO_2$ film 27 of 100 nm thickness (FIG. 6(c)). After the above processing, a metallic leaf 28 and an insulating film 21 are formed on the bottom surface of the Si substrate. Then the metallic leaf 28 is used as a plating base and Cu plating is applied to form the conductive paths 14 which penetrate the Si substrate. Then low-melting solders are evaporated by mask evaporation to form the bonding bumps 13 (FIG. 6(d)). Processes following the formation of the bonding bumps are the same as in FIG. 5. In the embodiment, the metallic leaf is used as a plating base. However, it will be recognized that a metallic film coated by evaporation or sputtering can be used as the plating base.

In the embodiment, the holes made in the Si substrate are filled up by plating. However, it will be appreciated that they can be filled up by capillary action. That is, the Si substrate with the holes, which penetrate it, is submerged in melted solders to fill up the holes. Further, in the embodiment, the Si substrates are used as substrates for the chip 1 and chip 2 by consideration on evenness of the surface of the substrate and workableness in etching. However, it will be appreciated that a resins substrate may be used if those conditions are satisfied. That is, a resins substrate, for example, an epoxy resins substrate may be used instead of the Si substrate shown in FIG. 5 and etched by reactive ion etching using an oxygen gas. Since the types of the selective removal of unwanted material exceeds 100 between the epoxy resins and the Ni film used as a masked material in etching, holes which penetrate the resins substrate can be easily formed.

Figure 7:
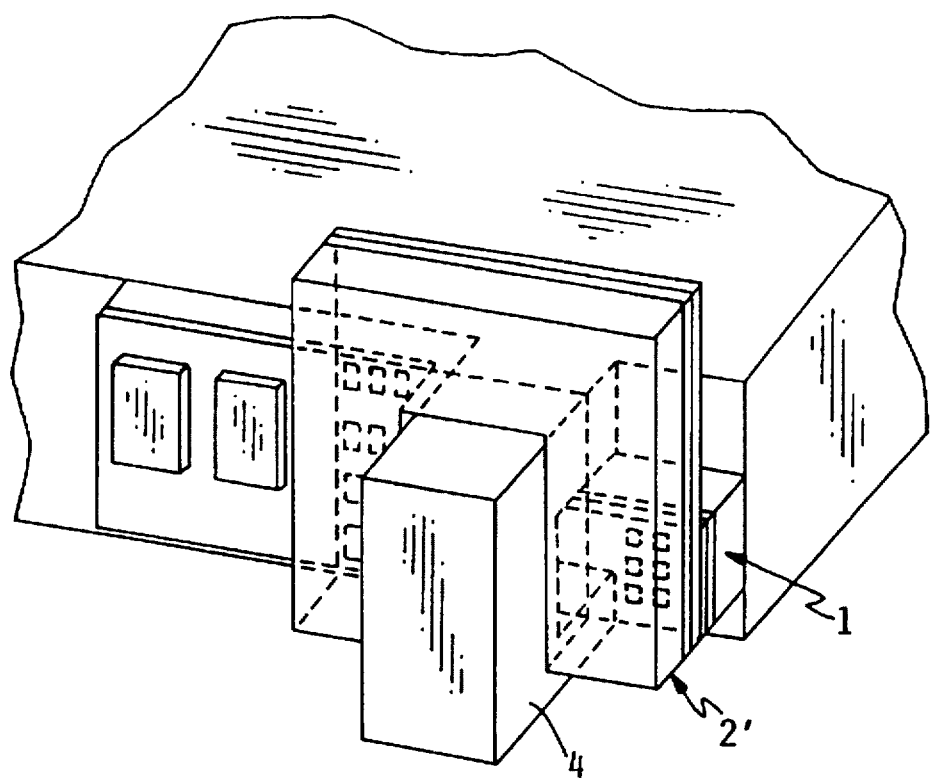
FIG. 7 is a perspective view of another embodiment of the present invention.
Figure 8:
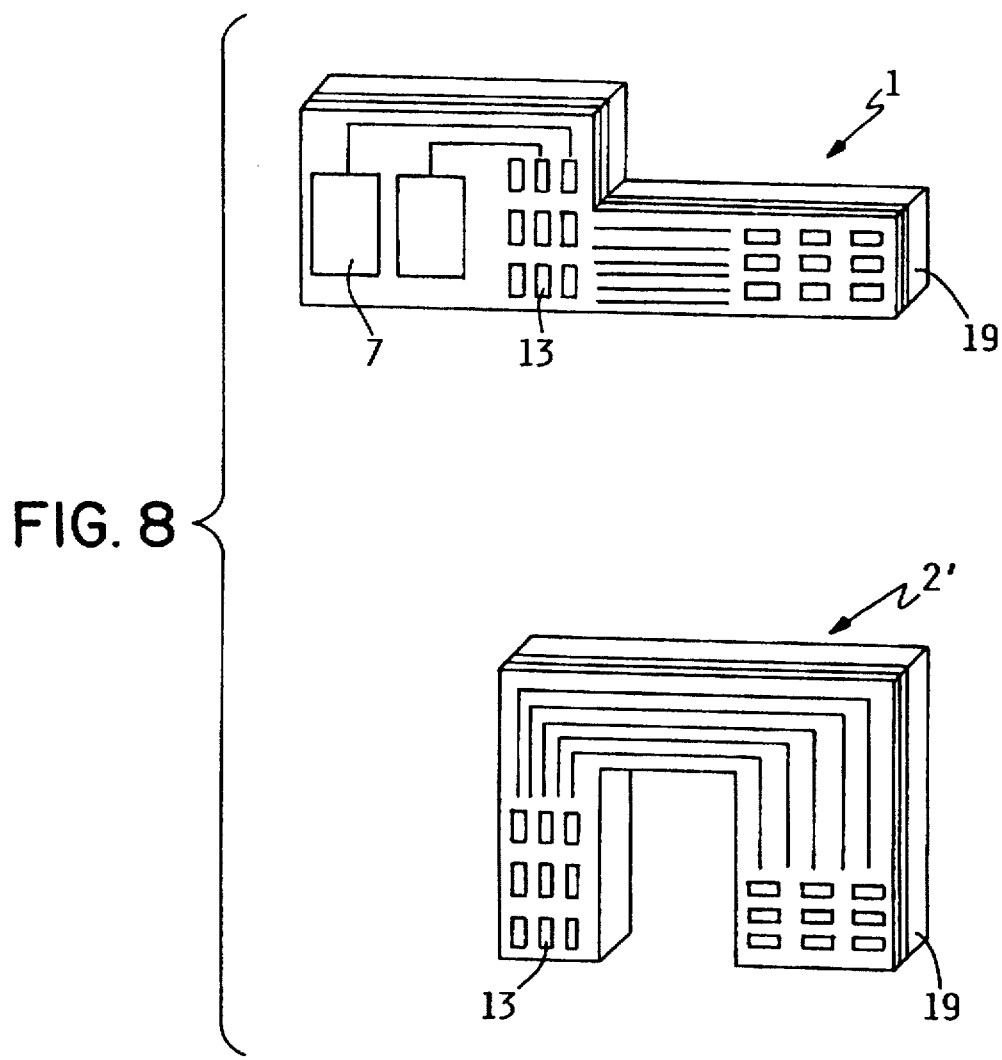
FIG. 8 shows perspective views of a laminated coil member according to the present invention.

In the following, another embodiment according to the present invention is described by reference to FIG. 7. As shown in FIG. 7, conductive paths straddling the ferrite core 4 are formed from a chip 2' with multi-layered Cu wires. Now, the chip 2' has not conductive paths which penetrate a substrate, but only the multi-layered wires on its surface. Chips are disposed as follows. First, a chip 1 is disposed so that its bottom faces the slider and the slender portion of its end is inserted in a winding window. Then the bottom of the chip 1 is bonded to the side surface of the slider. Then the chip 2' is disposed so that it faces the chip 1 and alignment is applied to the bonding bumps of both chips. After alignment, the bonding bumps of both chips are melted by heat treatment at 150 C. The multi-layered wires are thus bonded and a coil encircling the magnetic core is formed. FIG. 8 shows perspective views of chip 1 and chip 2'. Both chips with an insulating film 17 and Cu wires 15 alternately laminated on a substrate 19 are formed in the same manner as in FIG. 4. On the surface of the chip 1, bonding bumps 13, which are low-melting solders, and bonding pads 7 are formed. A magnetic gap is provided below the ferrite core.

Figure 9:
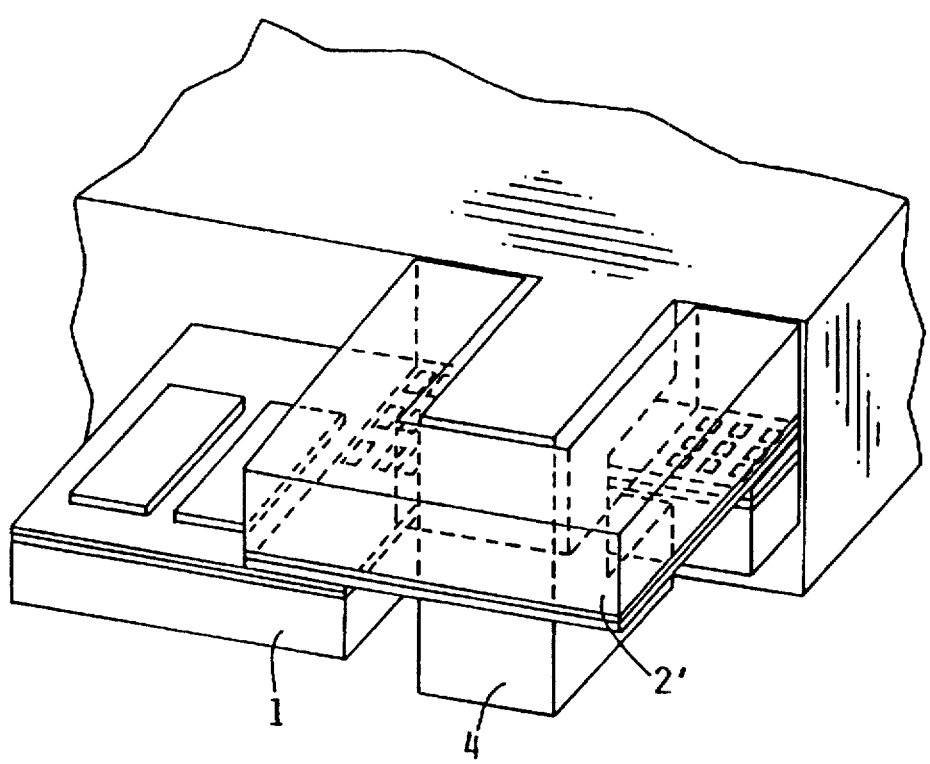
FIG. 9 is a perspective view of still another embodiment according to the present invention.

FIG. 9 shows still another embodiment of the present invention. In the figure, conductive paths straddling the ferrite core 4 are formed from a chip 2' with multi-layered Cu wires. However, the chip is at a position where it is turned by 90 to a slider differently from the previous embodiments. That is, the chip is disposed so that its surface on which the multi-layered wires are formed and the side surface of the slider intersect each other. In the embodiment, first the slender portion of a chip 1 is inserted in a winding window and the side surface of the chip is bonded to the side surface of the slider. Then the chip 2' is disposed so that its surface faces the surface of the chip 1 and alignment is applied to the bonding bumps of both chips. After alignment, their bonding bumps are melted by heat treatment at 150 C. Then the side surface of the chip 2' is bonded to the slider, thus joints between the chip and the slider become firm. In the above construction, a magnetic gap can be provided either above or below the ferrite core.

Figure 10:
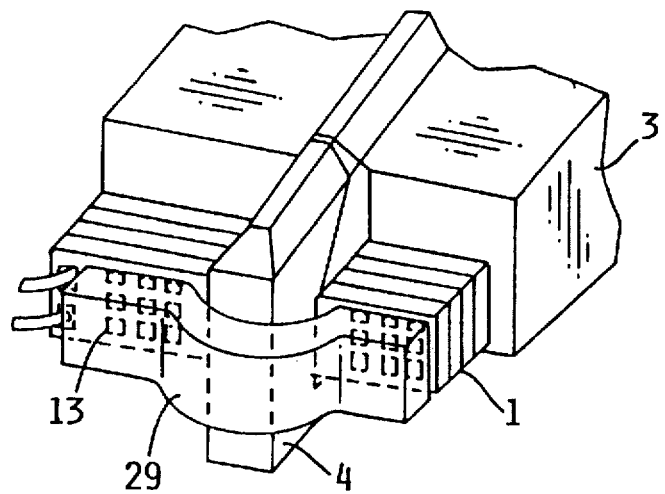
FIG. 10 is a perspective view of yet another embodiment according to the present invention.

In the following, yet another embodiment of the present invention is described by reference to FIG. 10. In the figure, a chip straddling the ferrite core 4 is formed from a flexible substrate and multi-layered Cu wires and bonding bumps are formed on the substrate. As shown in the preceding embodiments, the chip 1 with the multi-layered Cu wires formed on the Si substrate is inserted in a winding window and bonded to the side surface of the slider. Then the flexible substrate 29 is disposed so that it faces the chip 1 and the ferrite core 4 and the bonding bumps contact with each other, melt, and are bonded.

Figure 11:
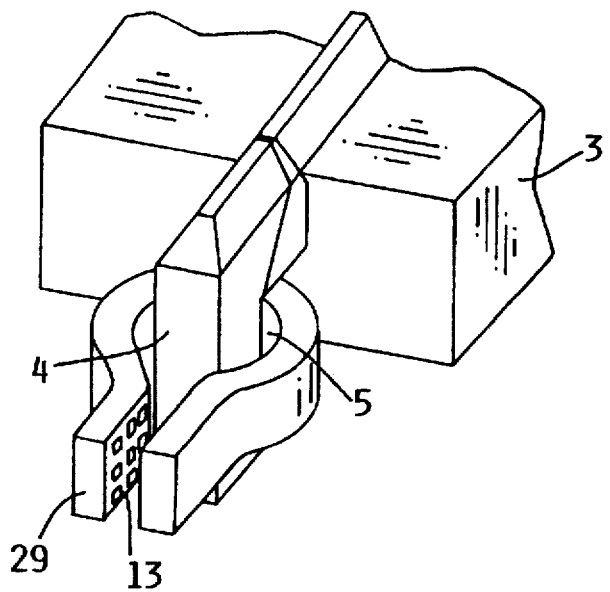
FIG. 11 is a perspective view of a further embodiment according to the present invention.

FIG. 11 shows a further embodiment of the present invention. A coil is formed only on a flexible substrate 29. That is, the flexible substrate described in the embodiment 2 is inserted in a winding window 5 and circled around the ferrite core 4. Then bonding bumps 13 at both ends of the flexible substrate contact with each other and melt, thereby the coil is formed.

Figure 12:
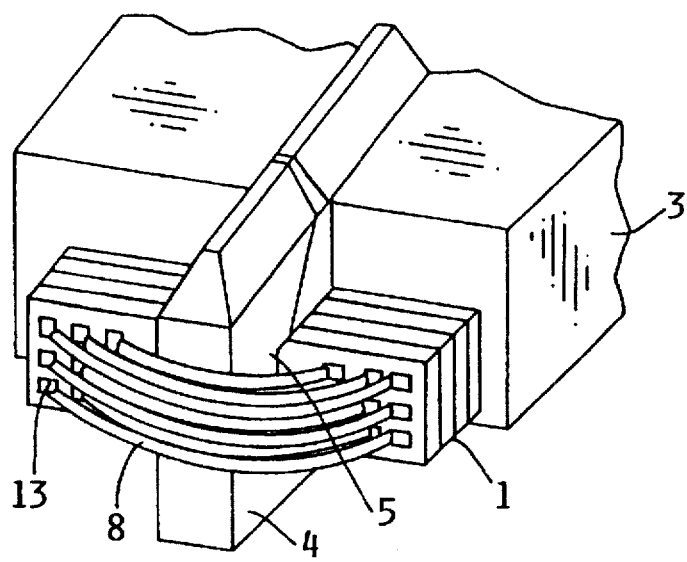
FIG. 12 is a perspective view of still a further embodiment according to the present invention.

FIG. 12 shows still a further embodiment of the present invention. In the figure, conductive paths straddling the ferrite core 4 are formed by wire bonding. That is, the Si chip 1 with multi-layered Cu wires, already described is inserted in the winding window 5 and bonded to the side surface of the slider 3. Then bonding is applied to wires 8 so that bonding bumps 13 at both ends of the substrate are connected with each other.

In the above embodiments, the magnetic head to which the laminated coil is applied, what is called monolithic-type head in which the slider itself is made of ferrite was described. Another type of head for a hard disk is a composite-type head in which a magnetic core is implanted in a nonmagnetic slider. Also in the composite-type head, the shapes of a winding window and the magnetic core are like those of the monolithic type and needless to say, the present invention can be applied also to the composite type head.

ADVANTAGES OF THE INVENTION

The laminated coil formed as described above can be a significantly smaller size than a conventional coil of wound Cu wire. The size of a ferrite core and a winding window can become significantly smaller, for example, decrease to one-half or less of that of a conventional core and winding window, thus high-frequency characteristic and head efficiency are improved. Further, since the laminated coil is directly bonded to the slider and not heavy, a heavy load is not applied to the ferrite core and construction strong for an external shock can be implemented. Further, since the laminated coil is formed by simply bonding two chips to each other, cost in coil winding can be significantly reduced.

What is claimed is:

1. A magnetic head attached to a carrier, said magnetic head comprising:
    a core of magnetic material, said core including a wire winding window, said core attached to said carrier;
    a first multilayer chip positioned in the wire winding window of said core, said first chip comprising a crystalline substrate, a first layer of conductive material deposited on said substrate, and a first insulative layer deposited over said conductive layer, said first layer of conductive material forming at least one conductive path therein with two ends, one end terminating at a first bonding bump protruding through said insulative layer and the other end terminating at a second bonding bump protruding through said insulative layer, said first and second bonding bumps being formed of a material having a melting point lower than that of said conductive material;
    a second multilayer chip, said second chip comprising a crystalline substrate, a first layer of conductive material deposited on said substrate, and a first insulative layer deposited over said conductive layer, said first layer of conductive material forming at least one conductive path therein with two ends, one end terminating at a third bonding bump protruding through said insulative layer and the other end terminating at a fourth bonding bump protruding through said insulative layer, said third and fourth bonding bumps being formed of a material having a melting point lower than that of said conductive material;
    wherein the second chip is positioned around the magnetic core and the first bonding bump of said first chip is aligned with the third bonding bump of said second chip, and the first and third bonding bumps are melted and bonded together to form a coil of conductive material around the magnetic core, said first chip and said second chip also respectively including first and second bonding pads respectively connected to said second and fourth bonding bumps;
    a first signal carrying conductor attached to said first bonding pad; and
    a second signal carrying conductor attached to said second bonding pad.

2. The magnetic head of claim 1 wherein one of said first or second chips has a groove therein for straddling the magnetic core.

3. The magnetic head according to claim 1 wherein said magnetic core is connected to a gap member, said gap member also connected to a slider.

4. The magnetic head of claim 1, wherein said crystalline substrate in said first chip and said crystalline substrate in said second chip are silicon.

5. The magnetic head of claim 1, wherein at least one of said first and second chips further comprise a second conductive layer deposited on said first insulative layer, and a second insulative layer deposited on said second conductive layer.

6. The magnetic head of claim 1 wherein one of said first and second chips includes a first portion which fits through the wire winding window of said magnetic core and includes a second portion that is larger than the wire window of said magnetic core.

7. The magnetic head of claim 6 wherein said one of said first and second chips having said first and second portions includes a surface which is attached to the surface of said carrier after the first portion is fitted through the wire winding window.

8. The magnetic head of claim 7 wherein said surface of said one of said first and second chips attached to the carrier is the surface substantially parallel to the surface carrying said bonding bumps.

9. The magnetic head of claim 7 wherein said surface of said one of said first and second chips attached to the carrier is the surface substantially perpendicular to the surface carrying said bonding bumps.

10. The magnetic head of claim 7 wherein said one of said first and second chips includes said fifth and sixth bonding pads.

11. The magnetic head of claim 1 wherein said first, second, third, fourth, fifth and sixth bonding pads are comprised of a low-melting solder.

12. In a magnetic head including a magnetic core and a slider, a method for manufacturing said magnetic head after at least a portion of said magnetic core is attached to said slider, said method comprising the steps of:

positioning a first multilayer chip inside of a wiring window, said first chip comprising a crystalline substrate, a first layer of conductive material deposited on said substrate, and a first insulative layer deposited over said conductive layer, said first layer of conductive material forming at least one conductive path therein with two ends, one end terminating at a first bonding bump protruding through said insulative layer and the other end terminating at a second bonding bump protruding through said insulative layer, said first and second bonding bumps being formed of a material having a melting point lower than that of said conductive material;

bonding said first chip to a surface of said slider;

positioning a second multilayer chip having a groove straddling said magnetic core, opposite said first chip, said second chip comprising a crystalline substrate, a first layer of conductive material deposited on said substrate, and a first insulative layer deposited over said conductive layer, said first layer of conductive material forming at least one conductive path therein with two ends, one end terminating at a third bonding bump protruding through said insulative layer and the other end terminating at a fourth bonding bump protruding through said insulative layer, said third and fourth bonding bumps being formed of a material having a melting point lower than that of said conductive material;

aligning the first bonding bump of the first chip with the third bonding bump of the second chip;

melting the first and third bonding bumps of both chips after aligning said first and second chips and bringing the first and third bonding bumps of both chips into contact while melted to form a coil around said magnetic core, said first and second chips further respectively having first and second bonding pads respectively connected to said second and fourth bonding bumps;

bonding a first signal carrying wire to the first bonding pad; and bonding a second signal carrying wire to the second bonding pad.

13. In said magnetic head, the method for manufacturing the magnetic head according to claim 12, comprising the steps of:

forming holes through a monocrystalline silicon used as a substrate for the second chip, by reactive ion etching; and filling said holes with conductive material by plating.

14. In said magnetic head, the method for manufacturing the magnetic head according to claim 12, comprising the steps of:

forming holes through a resin used as a substrate for the second chip, by reactive ion etching using an oxygen gas; and filling said holes with conductive material by plating.

15. In said magnetic head, the method for manufacturing the magnetic head according to claim 12, comprising the steps of:

forming holes though a monocrystalline silicon with (110) plane used as a substrate for the second chip, by etching using a KOH solution, or an ethylenediamine solution, or a hydrazine solution, or a mixed solution thereof;

forming a silicon oxide film on a surface of the silicon by thermal oxidation; and filling said holes with conductive material by plating.

16. In said magnetic head, the method for manufacturing the magnetic head according to claim 12, comprising the steps of:

forming holes through a substrate for one of said first or second chips; and filling said holes with conductive material.

17. A magnetic head including a magnetic core and a slider, said magnetic core being attached to said slider and forming a window between an edge of said slider and said magnetic core, said magnetic head comprising:

a first rigid multilayer chip having a thin film wire formed in a conductive layer therein and having a bonding bump on the surface of the first chip at one end of said wire, said first rigid chip being positioned in said window of said magnetic core;

a second rigid multilayer chip having a thin film wire formed in a conductive layer therein and having a bonding bump on the surface of the second chip at one end of said wire, said second chip being disposed outside of the window of said magnetic core;

wherein the bonding bumps of both chips are formed of a material having a melting point lower than that of said thin film wires in said first and second chips, and are heated and bonded together while heated to form a single wiring coil around said core, said second rigid multilayer chip bonded to said core, a first bonding pad being electrically connected to another end of said wire in said first chip and a second bonding pad being electrically connected to another end of said wire in said second chip;

a first signal carrying wire attached to the first bonding pad; and a second signal carrying wire attached to the second bonding pad.

18. The magnetic head of claim 17, wherein at least one of said first and second chips further comprise a plurality of conductive layers each having at least one thin film wire formed therein.

19. The magnetic head of claim 17, wherein said first and second chips comprise a silicon substrate.

* * * * *